US012656098B2

(12) United States Patent
McGovern et al.

(10) Patent No.: US 12,656,098 B2
(45) Date of Patent: Jun. 16, 2026

(54) THROUGH-TRANSMISSION EDDY CURRENT SYSTEM FOR INLINE INSPECTION OF POWER SOURCE ELECTRODES

(71) Applicants:GM GLOBAL TECHNOLOGY OPERATIONS LLC, Detroit, MI (US); IOWA STATE UNIVERSITY RESEARCH FOUNDATION, INC., Ames, IA (US)

(72) Inventors: Megan E. McGovern, Detroit, MI (US); Robin James, Rochester Hills, MI (US); Shaomao Xu, Sterling Heights, MI (US); Dmitriy Bruder, Clinton Township, MI (US); Yuan Ji, Chesterfield, VA (US)

(73) Assignees: GM GLOBAL TECHNOLOGY OPERATIONS LLC, Detroit, MI (US); IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 280 days.

(21) Appl. No.: 18/381,267

(22) Filed: Oct. 18, 2023

(65) Prior Publication Data

US 2025/0130033 A1     Apr. 24, 2025

(51) Int. Cl.
*G01B 7/06* (2006.01)
*G01B 7/02* (2006.01)
(52) U.S. Cl.
CPC ............ *G01B 7/105* (2013.01); *G01B 7/023* (2013.01)

(58) Field of Classification Search
CPC .......... G01B 7/023; G01B 7/105; G01B 1/00;
G01B 3/00; G01B 5/00; G01B 7/00;
G01B 9/00; G01B 11/00; G01B 13/00;
G01B 15/00; G01B 17/00; G01B 21/00;
G01B 2210/00; G01B 2290/00
See application file for complete search history.

(56) References Cited

U.S. PATENT DOCUMENTS

2016/0356735 A1* 12/2016 Holcomb ............. G01N 27/025
2020/0318941 A1* 10/2020 Jiang ...................... G01B 7/087

* cited by examiner

*Primary Examiner* — Judy Nguyen
*Assistant Examiner* — Brent J Andrews

(57) ABSTRACT

An eddy current non-destructive evaluation system for an electrode film material includes: at least one control module configured to generate a transmission signal; and a first pair of coils. The first pair of coils includes: a first coil disposed adjacent the electrode film material and configured to operate in a transmit mode, and, based on the transmission signal, to generate an electromagnetic field that passes through the electrode film material; and a second coil disposed adjacent and on an opposite side of the electrode film material as the first coil and configured to operate in a receive mode. The second coil is configured to generate a electromagnetic field voltage based on the electromagnetic field. The at least one control module is configured, based on the electromagnetic field voltage, to at least one of determine a thickness of the electrode film material and detect a defect of the electrode film material.

17 Claims, 15 Drawing Sheets

THROUGH-TRANSMISSION EDDY CURRENT SYSTEM FOR INLINE INSPECTION OF POWER SOURCE ELECTRODES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems for detecting and correcting characteristics of electrodes during manufacturing.

Traditional vehicles including internal combustion engines (ICEs) also include low-voltage (e.g., a 12 V) batteries. The low-voltage (LV) batteries are used for starting the ICEs and for powering various loads in the vehicles. The LV batteries are charged via alternators that convert mechanical energy from the ICEs to electrical energy to charge the LV batteries.

Electric vehicles, such as fully electric vehicles, battery electric vehicles (BEVs), and hybrid electric vehicles including plug-in hybrid electric vehicles (PHEVs), include high-voltage (HV) battery packs and LV batteries. A HV battery pack provides power to HV direct current (DC) loads and to an auxiliary power module that converts a high-voltage to a low-voltage to charge a low-voltage (LV) power source (or battery). The LV battery is used to power LV DC loads. The HV loads may include motors, which are used for propulsion purposes as well as other HV loads. The LV loads may include, for example, lights, window and seat motors, door locks, infotainment system devices, etc. A HV battery pack may have terminals at, for example, 400 V or 800 V. A LV battery may have terminals at, for example, 12V or 48V. A LV battery can be used to close a HV contactor when an electric vehicle is started to allow power from the HV battery pack to be supplied to motors and other HV loads.

SUMMARY

An eddy current non-destructive evaluation system for an electrode film material is disclosed. The system includes: at least one control module configured to generate a transmission signal; and a first pair of coils. The first pair of coils includes: a first coil disposed adjacent the electrode film material and configured to operate in a transmit mode, and, based on the transmission signal, to generate an electromagnetic field that passes through the electrode film material; and a second coil disposed adjacent and on an opposite side of the electrode film material as the first coil and configured to operate in a receive mode. The second coil is configured to generate a first electromagnetic field voltage based on the electromagnetic field. The at least one control module is configured, based on the first electromagnetic field voltage, to at least one of determine a first thickness of the electrode film material and detect a defect of the electrode film material.

In other features, the at least one control module is configured to operate the first coil in a receive mode and the second coil in a transmit mode such that the first coil generates a second electromagnetic field voltage, and to determine the first thickness based on the second electromagnetic field voltage.

In other features, the at least one control module is configured to i) determine a first complex transmission coefficient based on the first electromagnetic field voltage, ii) determine a second complex transmission coefficient based on the second electromagnetic field voltage, iii) average the first complex transmission coefficient and the second complex transmission coefficient, and iv) determine the first thickness based on the average.

In other features, the system further including a switching circuit connected between i) the at least one control module and ii) the first coil and the second coil, where the at least one control module is configured to control the switching circuit to transition operation of the first coil and the second coil between operating in the transmit mode and the receive mode.

In other features, the system further including an amplifier configured, based on the transmission signal, to generate a drive signal to drive the first coil, and to generate a reference signal proportional to the drive signal. The at least one control module is configured to determine the first thickness based on the reference signal.

In other features, the system further including: a first multiplier configured to downconvert the reference signal to a downconverted reference signal; and a second multiplier configured to downconvert a receive signal to a downconverted receive signal. The second coil generates the receive signal including the first electromagnetic field voltage. The at least one control module is configured to determine the first thickness based on the downconverted reference signal and the downconverted receive signal.

In other features, the transmission signal includes multiple frequencies.

In other features, the system further includes: a second pair of coils including a third coil and a fourth coil; and a multiplexer. The third coil is disposed adjacent the electrode film material and configured to operate in a transmit mode, and, based on the transmission signal, to generate an electromagnetic field that passes through the electrode film material. The fourth coil is disposed adjacent and on an opposite side of the electrode film material as the third coil and configured to operate in a receive mode, where the fourth coil is configured to generate a second electromagnetic field voltage based on the electromagnetic field generated by the third coil. The first multiplexer is configured to select between the second coil and the fourth coil. The at least one control module is configured to control a state of the first multiplexer, and to determine a second thickness based on the second electromagnetic field voltage.

In other features, the system further includes: a first amplifier configured to generate a first drive signal to drive the first coil based on the transmission signal and output a first reference signal based on the first drive signal; a second amplifier configured to generate a second drive signal to drive the third coil based on the transmission signal and output a second reference signal based on the second drive signal; and a second multiplexer configured to select between the first amplifier and the second amplifier. The at least one control module is configured to control a state of the second multiplexer, to determine the first thickness based on the first reference signal, and to determine the second thickness based on the second reference signal.

In other features, the system further includes at least one of a capacitance sensor and a laser vibrometer configured to determine a lift-off distance between the electrode film material and one of the first coil and the second coil. The at least one control module is configured to adjust the first thickness based on the lift-off distance.

In other features, the at least one control module is configured to operate the first coil to determine a lift-off distance between the electrode film material and one of the first coil and the second coil, and to adjust the first thickness based on the lift-off distance.

In other features, an eddy current non-destructive evaluation method for electrode film material is disclosed. The method includes: generating a transmission signal; operating a first coil, disposed adjacent the electrode film material, in a transmit mode, and, based on the transmission signal, to generate an electromagnetic field that passes through the electrode film material; operating a second coil, disposed adjacent and on an opposite side of the electrode film material as the first coil, in a receive mode, and to generate a first electromagnetic field voltage based on the electromagnetic field; and based on the first electromagnetic field voltage, at least one of determining a first thickness of the electrode film material and detecting a defect of the electrode film material.

In other features, the method further includes: operating the first coil in a receive mode and the second coil in a transmit mode such that the first coil generates a second electromagnetic field voltage; and determining the first thickness based on the second electromagnetic field voltage.

In other features, the method further includes: determining a first complex transmission coefficient based on the first electromagnetic field voltage; determining a second complex transmission coefficient based on the second electromagnetic field voltage; averaging the first complex transmission coefficient and the second complex transmission coefficient; and determining the first thickness based on the average.

In other features, the method further includes: based on the transmission signal, generating a drive signal to drive the first coil, and generating a reference signal proportional to the drive signal; and determining the first thickness based on the reference signal.

In other features, the method further includes: downconverting the reference signal to a downconverted reference signal; downconverting a receive signal to a downconverted receive signal; generating via the second coil the receive signal including the first electromagnetic field voltage; and determining the first thickness based on the downconverted reference signal and the downconverted receive signal.

In other features, the transmission signal includes multiple frequencies.

In other features, the method further includes: operating a third coil, disposed adjacent the electrode film material, in a transmit mode, and, based on the transmission signal, to generate an electromagnetic field that passes through the electrode film material; operating a fourth coil, disposed adjacent and on an opposite side of the electrode film material as the third coil, in a receive mode, and to generate a second electromagnetic field voltage based on the electromagnetic field generated by the third coil; and determining a second thickness based on the second electromagnetic field voltage.

In other features, the method further includes: generating a first drive signal to drive the first coil based on the transmission signal and outputting a first reference signal based on the first drive signal; generating a second drive signal to drive the third coil based on the transmission signal and outputting a second reference signal based on the second drive signal; determining the first thickness based on the first reference signal; and determining the second thickness based on the second reference signal.

In other features, the method further includes: determining a lift-off distance between the electrode film material and one of the first coil and the second coil; and adjusting the first thickness based on the lift-off distance.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
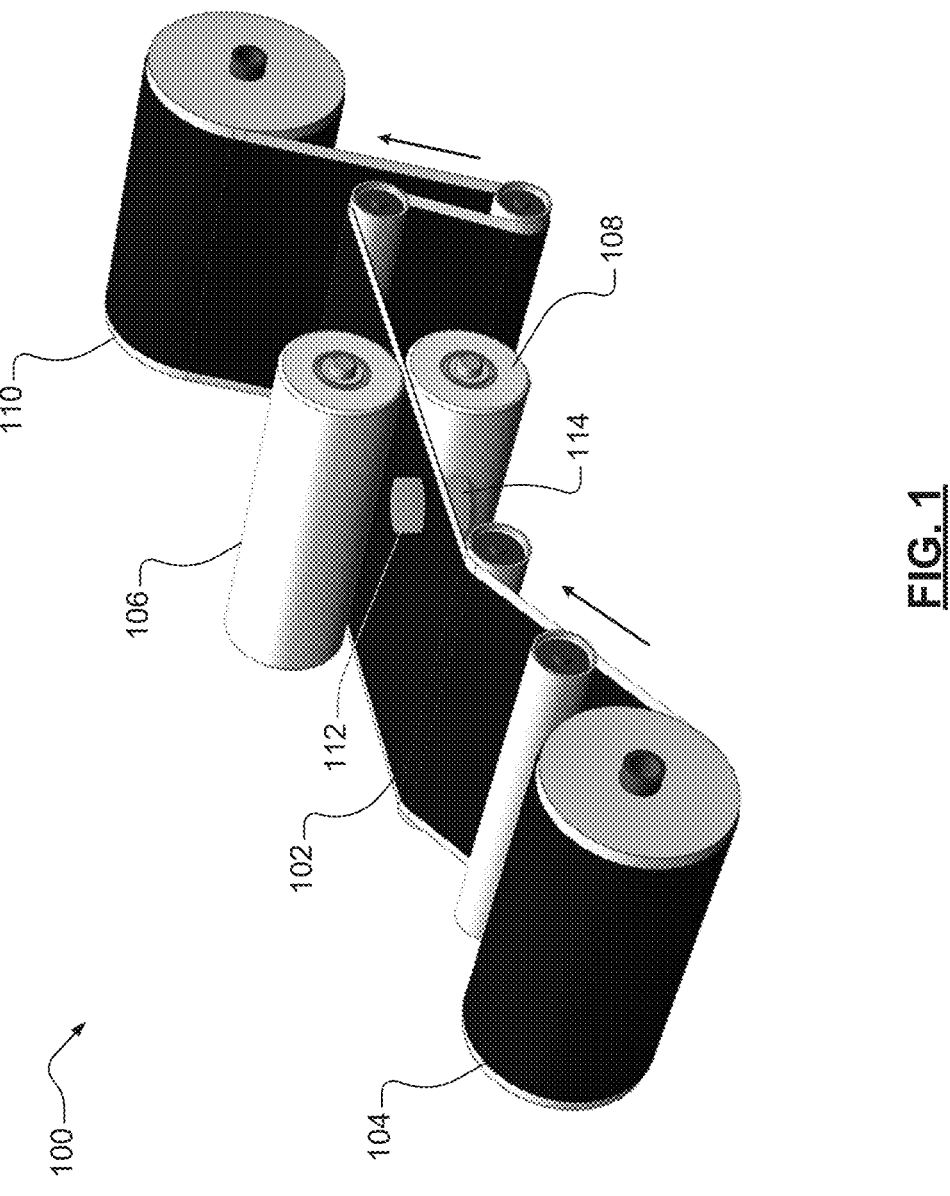
FIG. 1 a perspective view of a manufacturing system performing roll-to-roll processing with eddy current nondestructive evaluation (NDE) of electrode film material in accordance with the present disclosure.

Electric power sources, such as LV and HV batteries and battery packs for vehicles, include electrodes, referred to as cathodes and anodes. As an example, the anodes may include lithium. Lithium metal has a higher capacity than graphite. For example, 5 micrometers (μm) of lithium metal provides the same capacity of 1 milli-amp-hour per centimeter squared (1 mAh/cm$^2$) as 20 μm of graphite. Batteries can include thick lithium metal anodes (e.g., greater than 20 μm).

A lithium metal anode can be formed by applying a layer of lithium material to a layer of copper material to form a stack and cold rolling (or calendering) the stack between a pair of rollers. The pressure applied by the rollers to compress the stack can be adjusted. The pressure applied to the stack affects the resulting thickness of the stack. The thickness is directly related to the capacity of the formed electrode. In addition to thickness, surface defects, internal defects and surface roughness of the stack can also affect capacity of the formed electrode.

Destructive, offline, and/or contact-based methods may be used to detect thickness and variations in thickness of an electrode stack. The destructive, offline, and/or contact-based methods can include use of microscopes, physical contact-based gauges, etc. These methods are however intrusive, slow, costly, and unable to provide feedback in real time.

The examples set forth herein include eddy current NDE systems and methods for quickly and accurately detecting thicknesses of electrodes (or electrode film material) pre and post calendering of the electrodes (or electrode film material). The methods further include detecting defects of electrodes (or electrode film material) such as characteristics of electrode film material that affects impedance such as changes in porosity of the film material, large voids in the film material, and/or other defect that causes a non-uniform conductivity such as an agglomeration. The methods are robust, low-cost, high-speed, and non-contact methods. The eddy current NDE systems include a first one or more coils generating respective electromagnetic fields (or alternating current (AC) magnetic fields). The first one or more coils are on a first side of electrode film material. The electromagnetic fields generate EMF voltages in a second one or more coils on a second side of the electrode film material. The second side is opposite the first side. The EMF voltages are indicative of impedance differences that are indicative of differences in thicknesses and other characteristics of the electrode film material. This embodiment and other embodiments are further described below.

The eddy current NDE systems are through-transmission systems because of the electromagnetic fields that pass through the electrode film material. The eddy current NDE systems enable high line-speed (e.g., greater than 100 meters per minute m/min). The high line-speed refers to the moving speed of the electrode film material across and between rollers of a manufacturing system. Thicknesses and defects of the material may be detected at any point along the manufacturing system. In an embodiment, the thicknesses are detected roll-to-roll (i.e., along a path between consecutive rollers. The methods disclosed herein enable accurate measurement of thickness and thickness uniformity of electrode film material (e.g., within 1 μm accuracy) over a wide range of thicknesses. The systems disclosed herein may be used also to detect surface and internal defects of the electrode film material.

In some disclosed examples, eddy current NDE systems are provided that are configured for dual-phase measurements. In an embodiment, transmission switching is performed where i) during a first period of time, the first one or more coils are operated as transmitters and the second one or more coils are operated as receivers, and then ii) during a second period of time, the second one or more coils are operated as transmitters and the first one or more coils are operated as receivers. The EMF voltages generated by the receivers during the first period are averaged with the EMF voltages generated by the other receivers during the second period. Thicknesses are then determined based on the averages. The averaging reduces measurement error due to vertical vibration. During movement of electrode film material over rollers, vertical positioning of the material can vary due to vibration of the material. The dual-phase measurement significantly reduces measurement error by averaging the EMF voltages of the phases, as further described below. The averaging may be accomplished using hardware and/or software.

Real-time lift-off compensation is also disclosed herein. Lift-off refers to distance between a coil and adjacent electrode film material. As distances between electrode film material and adjacent coils vary, the distances are accounted for to provide an accurate measurement of electrode film material thickness, as further described below.

The examples disclosed herein are applicable to detecting thicknesses of cathodes, anodes, and layers thereof such as thicknesses of current collectors. The examples are applicable to electrodes and/or electrode layers formed of lithium, copper, sodium, silicon, graphite, aluminum, and/or other electrode materials.

FIG. 1 shows a manufacturing system 100 performing roll-to-roll processing with eddy current NDE of electrode film material 102. The manufacturing system 100 includes a first roller 104 having the electrode film material 102 that is fed between two calendering rollers 106, 108 to a second roller 110. The calendering rollers 106, 108 apply pressure of the electrode film material 102 to compress the electrode film material 102. Various rollers may be included to guide the electrode film material from the first roller 104 to the calendering rollers 106, 108 and from the calendering rollers 106, 108 to the second roller 110. A pair of coils including first and second coils 112, 114 are shown on opposite sides of the electrode film material 102. The coils 112, 114 are used to perform eddy current NDE as described herein. An example circuit for powering and controlling operation and timing of the coils 112, 114 is shown in FIG. 8. Although FIG. 1 shows a single pair of coils, any number of pairs may be included and arranged in various patterns. Arrays of coils may be included, as further described with respect to at least FIGS. 6, 7 and 9.

Figure 2:
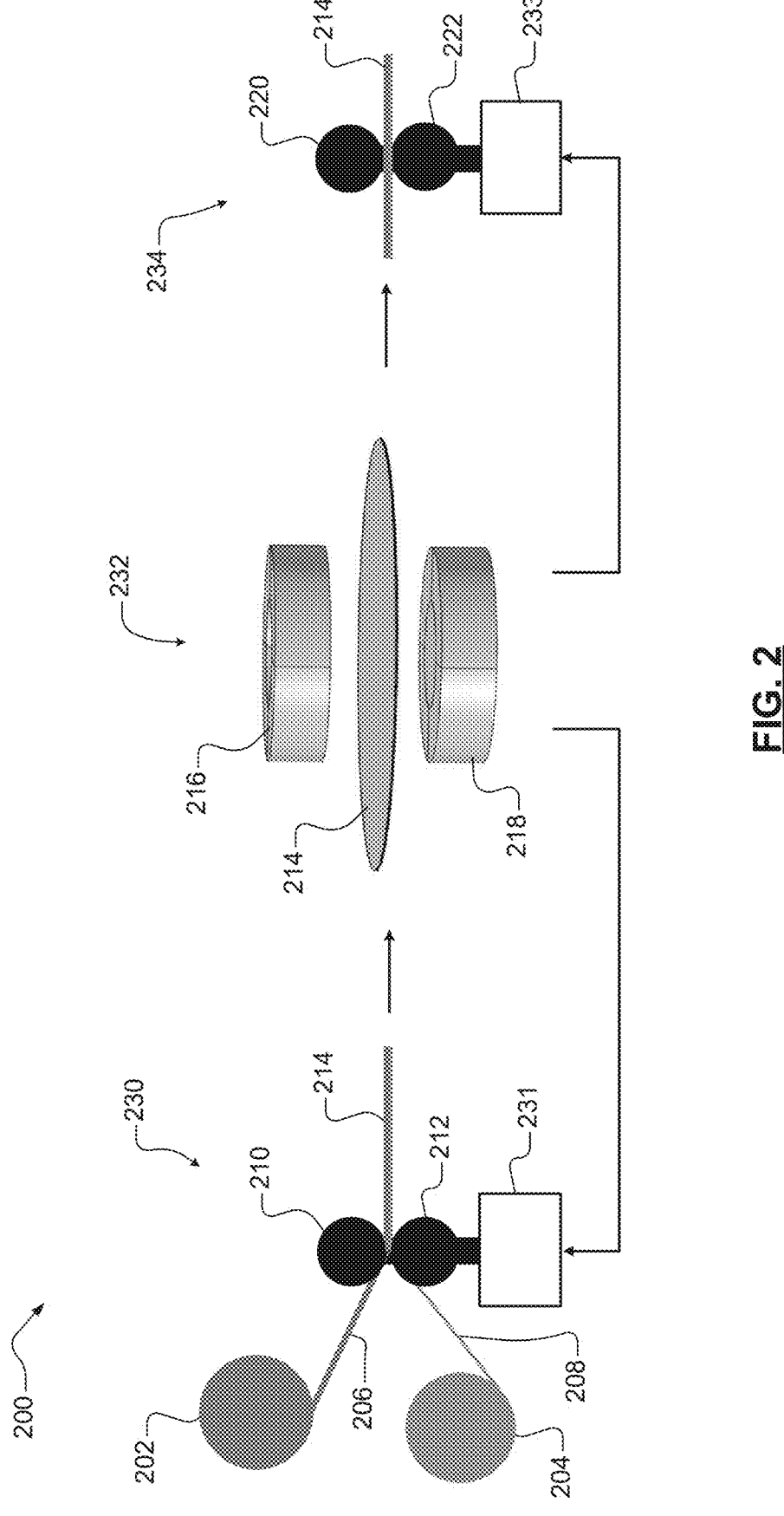
FIG. 2 is a diagram illustrating eddy current NDE with feedback and feedforward compensation in accordance with the present disclosure.

FIG. 2 shows a diagram 200 illustrating eddy current NDE with feedback and feedforward compensation. The diagram 200 includes material rollers 202, 204, which include respective material. As an example, the roller 202 may include a first material 206 such as lithium metal, and the second roller 204 may include a second material 208 such as copper. The first and second material 206, 208 are fed between first calendering rollers 210, 212 to form a stack, which is compressed by the rollers 210, 212. The first calendering (or laminating) rollers 210, 212 apply a laminating pressure on the stack 214. The compressed stack 214 is fed between two coils 216, 218 and then fed between a second calendering (or cold rolling) rollers 220, 222. The first calendering rollers 210, 212 are used during a first compression phase 230. The first compression phase is a pre-NDE processing phase. The coils 216, 218 are used during an intermediate evaluation phase 232. The second calendering rollers 210, 212 are used during a second compression phase 234 to apply a calendering pressure on the stack 214. The second compression phase is a post-NDE processing phase.

Feedback control (or adjustments) of the first compression phase 230 may be performed based on eddy current NDE performed using the coils 216, 218. This may include, for example, adjusting pressure applied to the stack 214 by the first calendering rollers 210, 212 based on detected thickness of the compressed stack 214. This may be done via actuators and motors 231, which may be controlled by, for example, one of the control modules of FIGS. 8-9. If the thickness is greater than a target thickness (or thickness range), then more pressure may be applied. Similarly, if the thickness is less than the target thickness (or thickness range), then less pressure may be applied. Feedforward control (or adjustments) may be performed based on eddy current NDE performed using the coils 216, 218. This may include, for example, compressing the stack 214 a second time and adjusting pressure applied by the second calendering rollers 220, 222. This may be done via actuators and motors 233, which may be controlled by, for example, one of the control modules of FIGS. 8-9. As another example, certain material having thickness(es) that are outside a target range may be discarded and/or not used to form electrodes. Although a single pair of coils is shown between the phases 230, 234, an additional pair of coils may be included subsequent to the second calendering rollers 220, 222 to detect thickness of the stack 214 subsequent to the second compression phase 234. In an embodiment, the stack 214 is compressed a second time if the thickness detected at phase 232 indicates that the thickness is greater than the target thickness (or thickness range). The pressure applied at 234 may be greater than the pressure applied at 230.

The lamination speed at which the first material 206 is applied to the second material 208, which is speed that the stack 214 moves through the system and is compressed, may also be adjusted based on the detected thickness. This may be done via the actuators and motors 231, 233 and/or other actuators and motors. For example, if the thickness is less than the target thickness (or thickness range), then the speed may be increased. If the thickness is greater than the target thickness (or thickness range), then the speed may be reduced.

The positions of the first calendering rollers 210, 212 may also be adjusted based on the detected thickness via the actuators and motors 231. If the thickness is greater than the target thickness (or thickness range), then the first calendering rollers 210, 212 are moved closer to each other. One of the rollers 210, 212 may be moved closer to the other one of the rollers 210, 212. If the thickness is less than the target thickness (or thickness range), then the first calendering rollers 210, 212 are moved away from each other. One of the rollers 210, 212 may be moved away from the other one of the rollers 210, 212. This may similarly be performed during feedforward control to adjust distance between the rollers 220, 222 via the actuators and motors 233. Surfaces of the rollers 220, 222 may be adjusted to smooth out the first material 206 in the stack 214.

Figure 3:
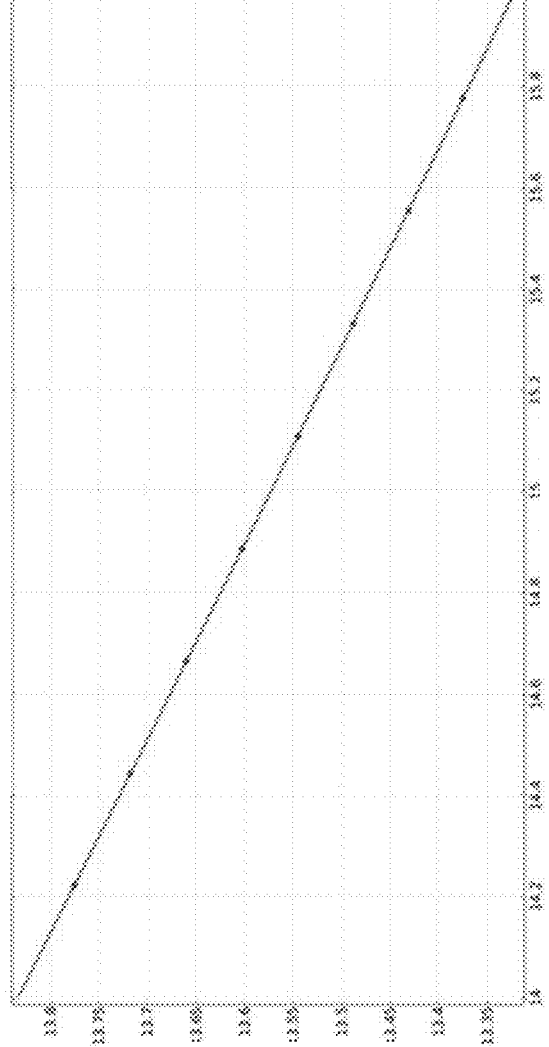
FIG. 3 is an example plot of electromagnetic field (EMF) voltage versus thickness of electrode film material.

FIG. 3 shows a plot of EMF voltage versus thickness of electrode film material. As an example, if current is supplied to the first coil 112 of FIG. 1, then an EMF voltage is generated in the second coil 114, which may be detected. The EMF voltage is dependent on the thickness of the electrode film material 102. As the thickness increases, the EMF voltage decreases and vice versa, as shown by the plot. The eddy current NDE methods described herein are based on transmission of high-frequency magnetic field, which generates the EMF voltage. The plot is shown as an example when there is no vibration and relative distance change (or vertical deflection) of the electrode film material is 0 (i.e., distances between the coils 112, 114 and the electrode film material 102 does not change).

Figure 4:
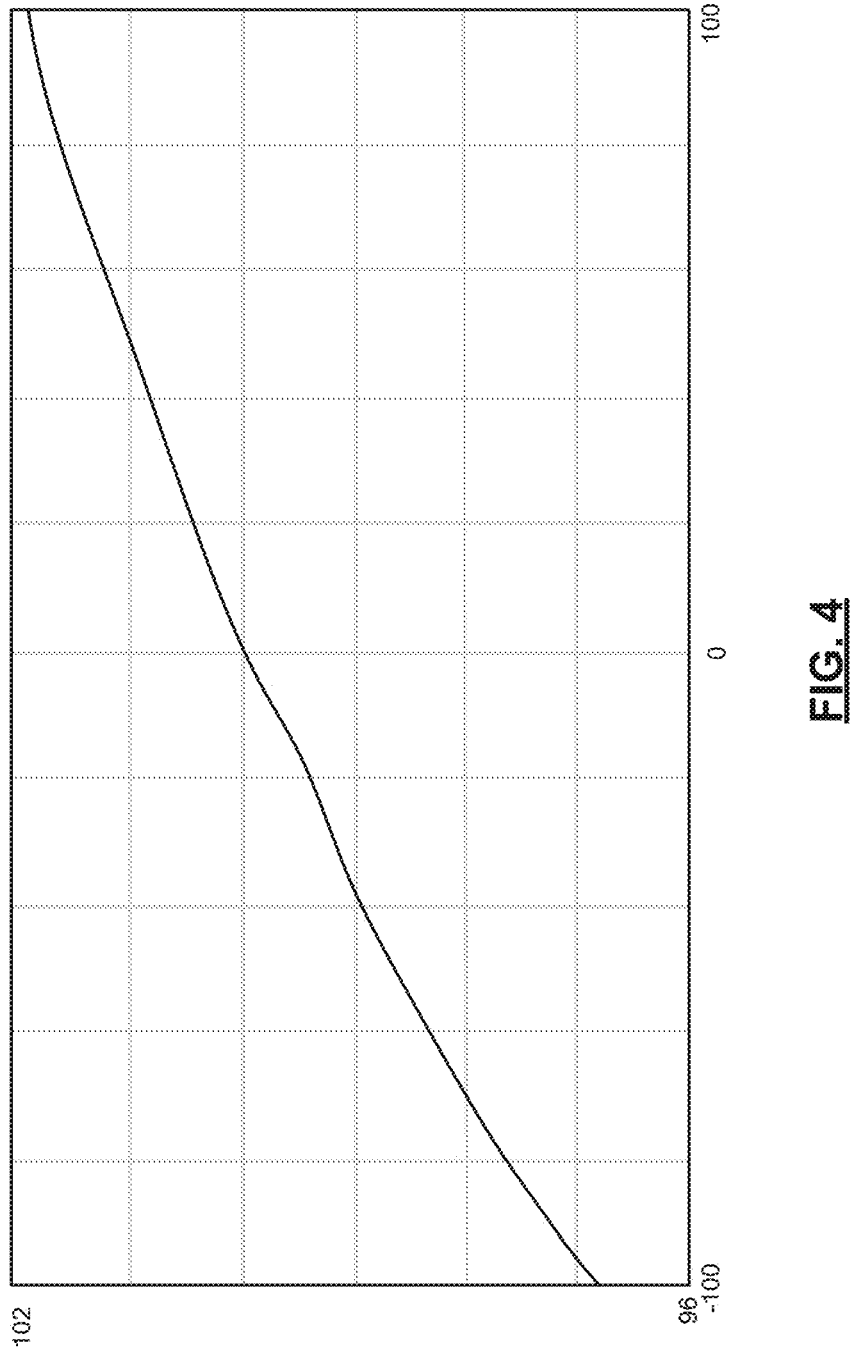
FIG. 4 is an example plot of normalized change in EMF voltage versus vertical position of electrode film material relative to a center point between EMF coils in accordance with the present disclosure.

FIG. 4 shows a plot of normalized change in EMF voltage versus vertical position of electrode film material relative to a center point between EMF coils. The 0 Z position of the plot refers to when the electrode film material 102 of FIG. 1 is "centered" and thus equally distanced from the first and second coils 112, 114. As the electrode film material 102 moves closer to the first (or transmitting) coil 112, the change in the normalized EMF voltage decreases. As the electrode film material 102 moves closer to the second (or receiving) coil 114, the change in the normalized EMF voltage increases.

Vibration of the sample (or electrode film material 102) introduces systematic error that cannot be filtered out using software. The examples disclosed herein include performing a dual-phase measurement routine that includes during a first phase (phase 1), transmitting a signal via the first coil 112 and generating a first EMF voltage at the second coil 114. During a transition phase, the role of the coils 112, 114 is switched. During a second phase (phase 2), the second coil 114 is operating as the transmitting coil and is transmitting a signal and the first coil 112 is operating as a receiving coil and is outputting a second EMF voltage. This switch takes a predetermined period of time (e.g., 4 μs). As an example, each of the first phase and the second phase may last 8 μs. Because of how short each phase is and how quickly switching between phases occurs, the electrode film material is perceived by the system as motionless (not vibrating) even though the electrode film material is vibrating. This allows i) the system to detect the thickness accurately regardless of whether the electrode film material is vibrating (or moving vertically), and ii) high line speed of the roller (e.g., 100 meter/min) because for such a high line speed, the sample only travels 33 micrometers (μm) during a 20 microsecond (μs) measurement window.

Figure 5:
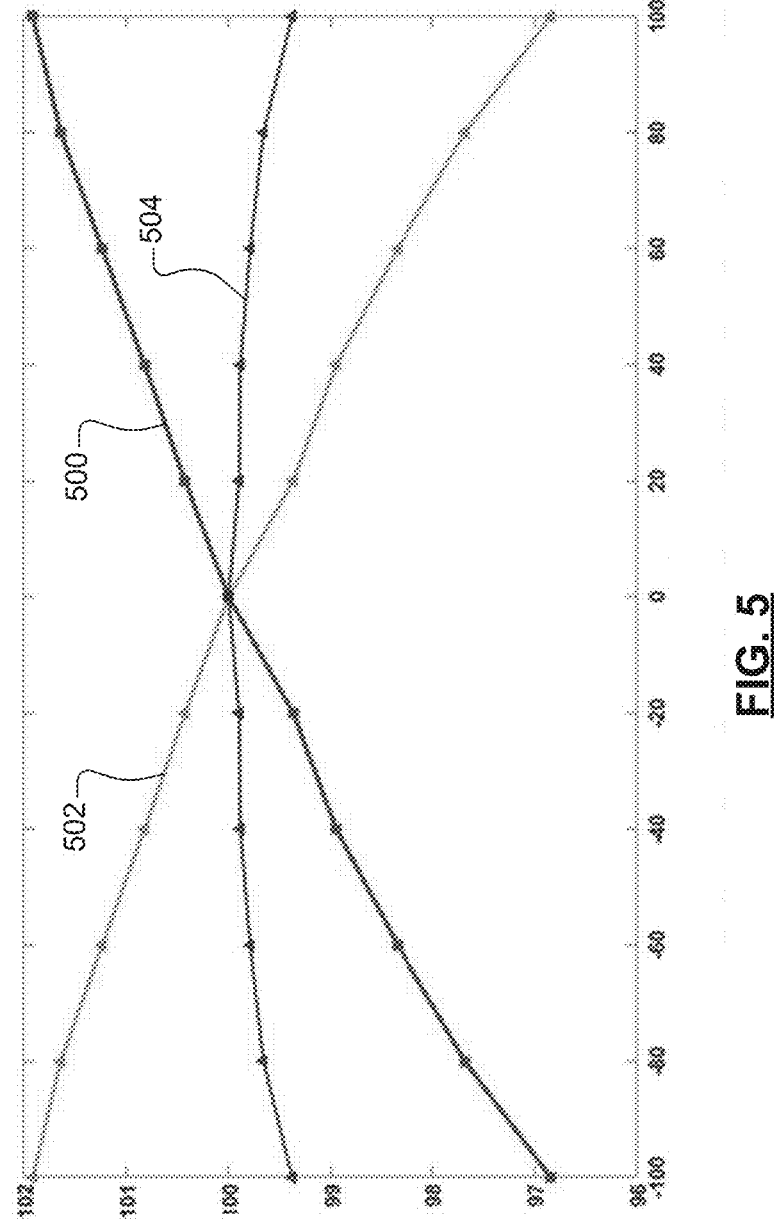
FIG. 5 is an example plot of normalized change in EMF voltage versus vertical position for phase 1, phase 2 and combined eddy current monitoring in accordance with the present disclosure.

FIG. 5 shows a plot of normalized change in EMF voltage versus vertical position for phase 1, phase 2 and combined eddy current monitoring. A first curve 500 represents phase 1. A second curve 502 represents phase 2. A third curve 504 represents a combination and averaging of the outputs provided during phase 1 and phase 2. Combining results from phase 1 and phase 2 can significantly reduce systematic error due to motion in z-direction (e.g., due to vibration). In the example shown, the combined result has less than 1% error, which is more than three times lower systematic error.

Figure 6:
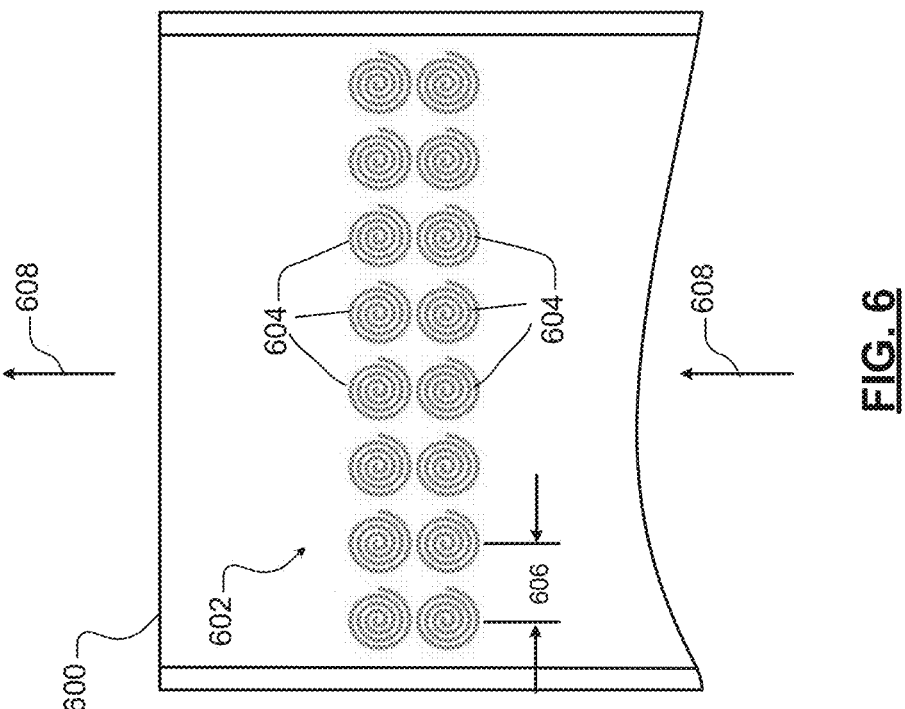
FIG. 6 is a top view of electrode film material and a non-staggered array of electromagnetic coil pairs arranged in parallel rows and columns in accordance with the present disclosure.

FIG. 6 shows electrode film material 600 and a non-staggered array of electromagnetic coil pairs 602 arranged in parallel rows and columns. Only the top coils 604 of each of the pairs is shown in FIG. 6. Bottom coils of the pairs are located below the electrode film material 600 are below and horizontally aligned with the respective top coils. The effective pitch (or closest distance between centers of coils in a lateral direction) is designated 606. Movement of the electrode film material 600 is represented by arrows 608.

Figure 7:
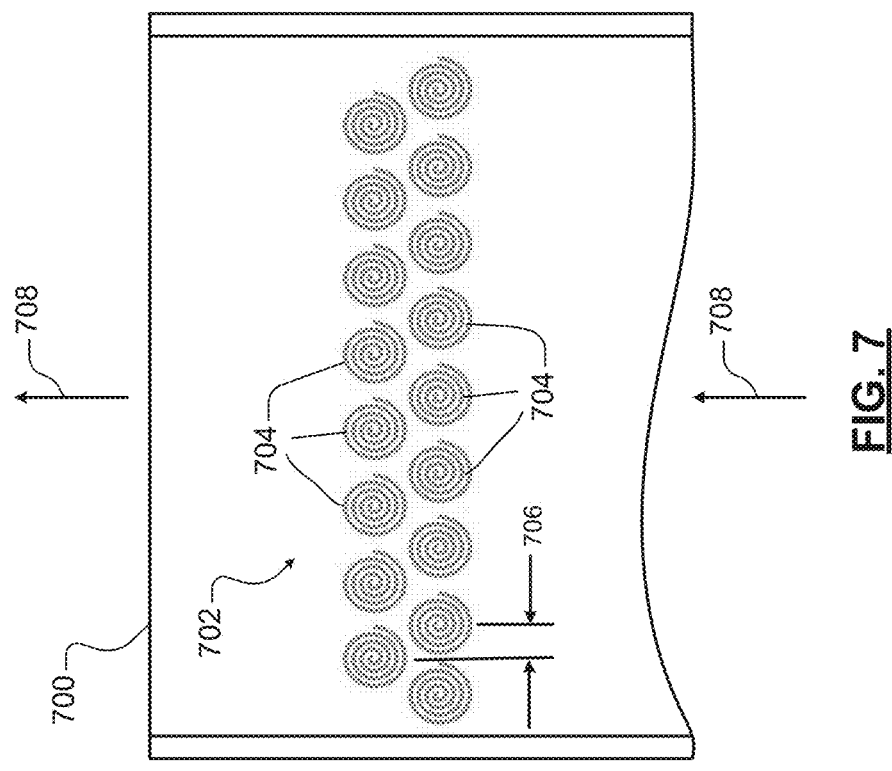
FIG. 7 is a top view of electrode film material and a staggered array of electromagnetic coil pairs arranged in parallel rows and offset columns in accordance with the present disclosure.
Figure 8:
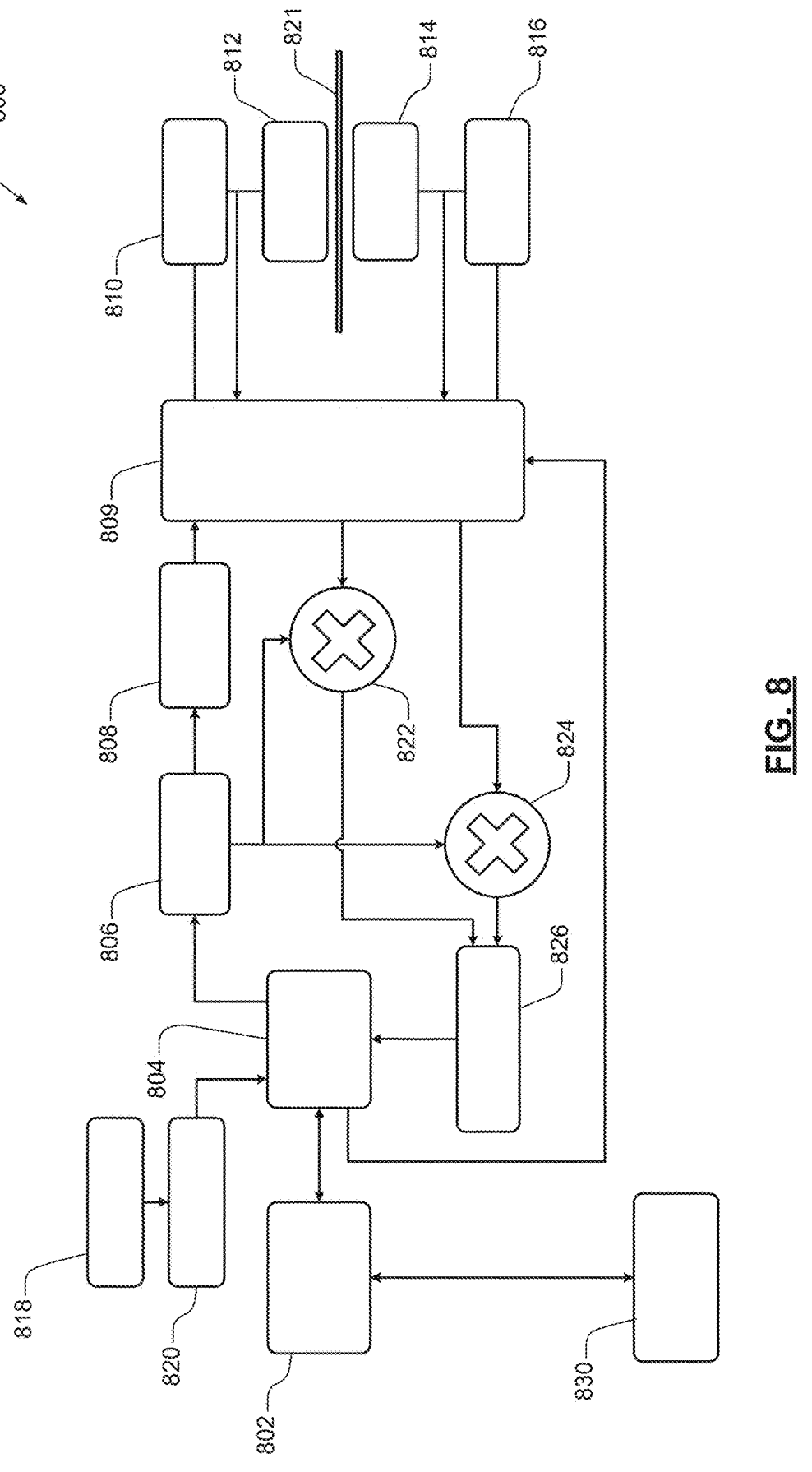
FIG. 8 is a schematic diagram of a dual-phase eddy current NDE circuit configured for a pair of coils in accordance with the present disclosure.

FIG. 7 shows electrode film material 700 and a staggered array of electromagnetic coil pairs 702 arranged in parallel rows and offset columns. Only the top coils 704 of each of the pairs is shown in FIG. 7. Bottom coils of the pairs are located below the electrode film material 700 are below and horizontally aligned with the respective top coils. The effective pitch (or closest distance between centers of coils in a lateral direction) is designated 706. By offsetting the coils, the effective pitch is reduced. The effective pitch provided by the arrangement of FIG. 7 is less than the effective pitch provided by the arrangement of FIG. 6. The staggered array of coils improves lateral resolution. Movement of the electrode film material 700 is represented by arrows 708.

The coil arrays of FIGS. 6-7 may be arranged separate from rollers or may be incorporated into rollers. For example, the arrays may be incorporated into calender rollers and/or other rollers, such as those referred to herein and/or shown in FIGS. 1-2. This may be done to minimize lift-off variation.

The coil pairs may be triggered periodically and/or in a predetermined pattern. In an embodiment, each of the coil pairs is triggered periodically to track a variation in thickness along a longitudinal line extending in a direction of motion of the corresponding electrode film material being evaluated.

In another embodiment, one or more coil pairs are mounted on a C-arm, where upper coils are on one end of the C-arm and lower coils are mounted on a second end of the C-arm. The C-arm is moved laterally to scan thickness variation laterally across the electrode film material.

The coil pairs may be disposed in various patterns relative to the electrode film material. For example, the coil pairs may be arranged in a staggered pattern, a diagonal pattern, a triangle pattern, etc. Timing of the coil pairs may be staggered to capture thickness variations along a single line extending across the corresponding electrode film material being evaluated. The line may extend laterally across the electrode film material in a direction perpendicular to a direction of material movement and/or diagonally across the electrode film material.

Figure 9:
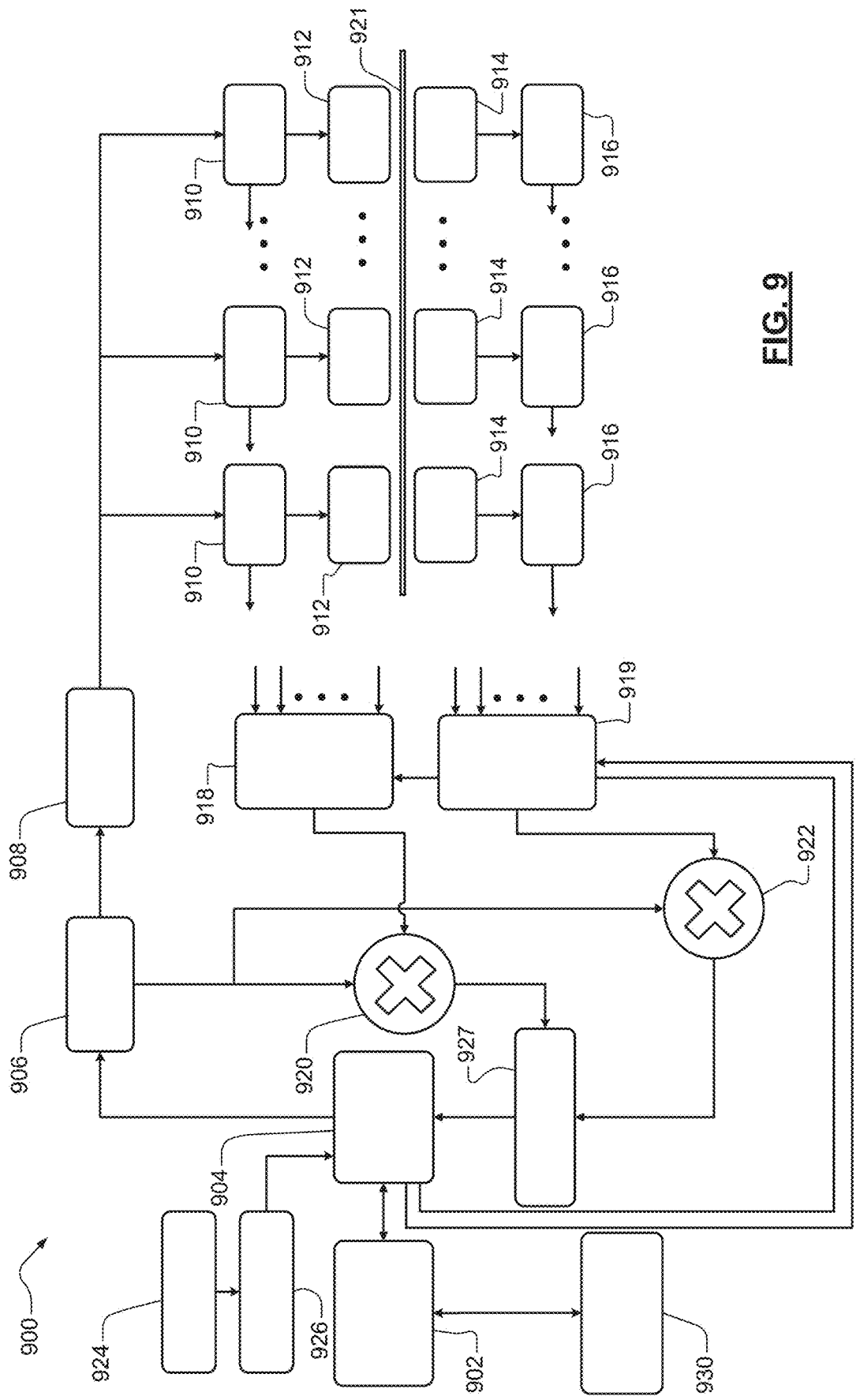
FIG. 9 is a schematic diagram of an eddy current NDE circuit configured for an array of coil pairs in accordance with the present disclosure.

Drive signals provided to transmit coils of the coil pairs and/or reference signals proportional to the drive signal may be monitored and multiplexed. Also, signals generated by the receive coils of the coil pairs may also be multiplexed. This is done to minimize the number of data channels used to drive the transmit coils and the number of channels used to receive the signals generated at the receive coils. Example multiplexers are shown in FIG. 9.

FIG. 8 shows a dual-phase eddy current NDE circuit 800 configured for a pair of coils, such as any pair of coils referred to herein. The dual-phase eddy current NDE circuit 800 includes a control module 802, a field programmable gate array (FPGA) 804, a digital-to-analog converter (DAC) 806, a low pass filter (LPF) 808, a switching circuit 809, a first amplifier 810, a first coil 812, a second coil 814, a second amplifier 816. In an embodiment, the FPGA 804 and the control module 802 are implemented as a single control module. In another embodiment, the FPGA 804 and the control module 802 are implemented as separate control modules. An oscillator 818 generates an oscillating signal, which is provided to a clock generator 820. The clock generator 820 generates one or more clock signals based on the oscillating signal, which may be provided to the FPGA 804. The FPGA 804, based on the one or more clock signals, outputs concurrently one or more signals having respective frequencies to the DAC 806. As an example, the frequencies may be between 5-40 MHz. The FPGA 804 is configured to selectively adjust a number of signals outputted concurrently, the frequencies of the signals, and the timing of signals. The FPGA 904 may implement superposition of tone bursts of multiple frequencies into one signal. In another embodiment, the FPGA 804 implements chirping for time invariant, cycle time reduction (e.g., 200 μs for 100 meters/minute roll speed). Chirping includes pulsed signaling with change frequencies.

The FPGA 804 as shown or the control module 802 may control the switching performed by the switching circuit 809. The switching includes switching between phase 1 and phase 2. The FPGA 804 may, for example, generate an image signal having a frequency centered at 200 MHz. The LPF 808 suppresses high order frequencies to eliminate aliasing effect of the drive signal.

The DAC 806 is a 2-channel DAC including a first channel for transmission and a second channel for internal data processing and downconverting to provide a local oscillator signal. An output of the first channel (or transmission channel) is a transmission signal provided to the LPF 808. The LPF filters the transmission signal and outputs the filtered signal to the first amplifier 810 (referred to as the driver). As an example, the filtered transmission signal may be a 20 MHz signal or a signal having multiple frequencies between 5-40 MHz. A corresponding one of the amplifier 810, 816 amplifies the filtered signal, which is then transmitted as a drive signal via one of the coils 812, 814 (referred to as the transmit coil for the current phase). An electromagnetic field is generated through electrode film material 821 and an EMF voltage (receive signal) is generated at a second one of the coils 812, 814 (referred to as the receive coil). The EMF voltage is amplified by a second corresponding one of the amplifiers 810, 816.

A local oscillator (LO) signal generated by the DAC 806 via the second channel of the DAC 806 is provided to multipliers 822, 824. The multiplier 822 multiplies the LO signal (e.g., 15 megahertz (MHz) sine wave) by a reference signal from a corresponding one of the amplifiers 810, 816 to provide a downconverted reference signal. The reference signal is proportional to the drive signal. The multiplier 824 multiplies the LO signal by the output of the second one of the amplifiers 810, 816, which is a received signal that has been amplified and is at a same frequency as the drive signal. The received signal is proportional to an AC attenuated magnetic field created by transmission of the drive signal. The output of the multiplier 824 is referred to as the downconverted EMF (or receive) signal. As an example, the downconverted reference signal and the downconverted receive signal may be 1-5 MHz signals. The outputs of the multipliers 822, 824 are provided to an analog-to-digital converter (ADC) 826. The ADC 826 is a two channel ADC, which outputs analog signals representative of the outputs of the multipliers 822, 824 to the FPGA 804.

The above-stated operations are repeated after switching to the second phase such that the second one of the coils 812, 814 is the transmit coil and the first one of the coils 812, 814 is the receive coil. The FPGA 804 and/or the control module 802 may then combine and/or average the downconverted EMF signals from phase 1 and phase 2. The FPGA 804 and/or the control module 802 may convert the downconverted EMF signals to complex transmission coefficients, which may then be averaged. The complex transmission coefficients are proportional to a ratio between the EMF voltages and the reference signal. The average may then be converted to an electrode film material thickness. The stated conversions may be implemented by software executed by the FPGA 804 and/or the control module 802. The conversions may be made using equations, relationships, plots, tables, etc. In an embodiment, a table is used to convert the average complex transmission coefficient to a thickness. The thickness may be determined based on an average of amplitudes and/or an average of phases of the complex transmission coefficients. The determined average and/or thickness may also be used to detect defects, referred to above.

By monitoring the drive signal and the receive signal and by normalizing the EMF voltage of the receive signal with respect to the drive signal, change due to thermal drift can be detected and accounted for to improve accuracy of the resultant thickness.

A wireless module 830 may be included and connected to the control module 802. The wireless module 830 may transfer results from the circuit 800 to a device remotely located from the circuit 800.

The circuit 800 may be operated in a single-sided (single-phase) mode or a dual-sided (dual-phase) mode. The single-phase mode refers to running one coil as a transmit coil and the other coil as a receive coil. The dual-phase mode refers to running each of the coils as a transmit coil and as a receive coil in an alternating manner, as described above.

FIG. 9 shows an eddy current NDE circuit 900 similar to that of FIG. 8, which may be operated in single-phase or dual-phase modes. Except that the circuit 900 is configured for an array of coil pairs. FIG. 9 also is shown for phase 1, but is similarly connected for phase 2, except the transmit coils are operated as receive coils and the receive coils are operated as transmit coils. The switching circuity for switching between phase 1 and phase 2 is also not shown in FIG. 9 but is similar to that shown in FIG. 8. The eddy current NDE circuit 900 includes a control module 902, a FPGA 904, a DAC 906, a LPF 908, first amplifiers 910, first (or transmit) coils 912, second (or receive) coils 914, second amplifiers 916, multiplexers 918, 919, and multipliers 920, 922. In an embodiment, the FPGA 904 and the control module 902 are implemented as a single control module. In another embodiment, the FPGA 904 and the control module 902 are implemented as separate control modules.

The circuit 900 further includes an oscillator 924 that generates an oscillating signal, which is provided to a clock generator 926. The clock generator 926 generates one or more clock signals based on the oscillating signal, which may be provided to the FPGA 904. The FPGA 904, based on the one or more clock signals, outputs concurrently one or more signals having respective frequencies to the DAC 906. The FPGA 804 is configured to selectively adjust the number of signals outputted concurrently, the frequencies of the signals, and the timing of signals. The FPGA 904 as shown or the control module 902 may control the switching performed between phase 1 and phase 2. The LPF 908 suppresses high order frequencies to monitor the drive signals generated by the amplifiers 910.

The LPF 908 filters the received signal and outputs the filtered signal to the first amplifiers 910 (referred to as the drivers). The amplifiers 910 amplify the filtered signal. The amplified signals are transmitted as the drive signals via one of the coils 912 (referred to as the transmit coils for the current phase). Electromagnetic fields are generated through electrode film material 921 and EMF voltages (receive signals) are generated at the coils 914 (referred to as the receive coils). The EMF voltages are amplified by amplifiers 916.

Reference signals output by the amplifiers 910 are provided to the first multiplexer 918. The first multiplexer 918 selects one of the received signals to provide to the multiplier 920. The local oscillator signal generated by the DAC

906 is provided to multipliers 920, 922. The multiplier 920 multiplies the local oscillator signal (e.g., 5-15 megahertz MHz signal) by the selected reference signal to provide a resultant reference signal. The multiplexer 919 selects one of the EMF signals output by the amplifiers 916. The multiplier 922 multiplies the local oscillator signal by the selected one of the EMF signals. The output of the multiplier 922 is referred to as the downconverted EMF signal. The outputs of the multipliers 920, 922 are provided to an analog-to-digital converter (ADC) 927. The ADC 927 is a two channel ADC, which outputs analog signals representative of the outputs of the multipliers 918, 919 to the FPGA 904. The selections performed by the multiplexers 918, 919 may be made by the FPGA 904 and/or the control module 902.

The coils 912, 914 may be arranged similar to the arrangements of FIGS. 6-7. The on and off timing, the phase, the duty cycles, the frequencies, etc. of the signals transmitted by the coils 912, 914 may be adjusted and set. The timing may be controlled for concurrent and/or consecutive selection of the coil pairs.

A wireless module 930 may be included and connected to the control module 902. The wireless module 930 may transfer results from the circuit 900 to a device remotely located from the circuit 800.

Lift-Off Compensation

From the plot of FIG. 4, it can be seen that if the actual lift-off is unknown, then there is an error component that is random. For example, +100 μm of vertical movement introduces a 2% error. A −100 μm of vertical movement provides a 3% error. If the lift-off distance variation is unknown, the error cannot be corrected. If however, the lift-off distance variation is able to be determined, the error can be minimized and/or eliminated by looking at the plot of FIG. 4 and compensating for the corresponding error. After correcting the error, which may have been introduced due to vibration of the electrode film material, the "vibration free" complex transmission coefficient is determined as if the sample remained at the center (symmetric plane) location between the coils. By either calibration using a known sample or finite element model simulation or other numerical approach, the thickness of the sample may be determined based on the "vibration free" complex transmission coefficient.

Figure 10:
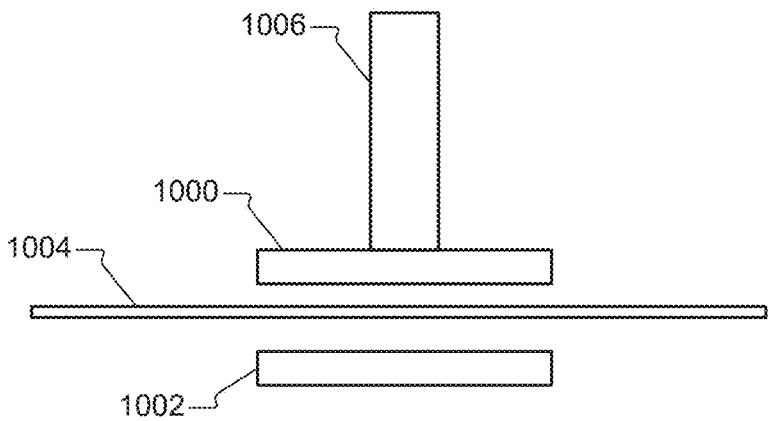
FIG. 10 is a side view of a pair of coils used for eddy current NDE of electrode film material and a capacitance sensor to account for high lift-off in accordance with the present disclosure.
Figure 11:
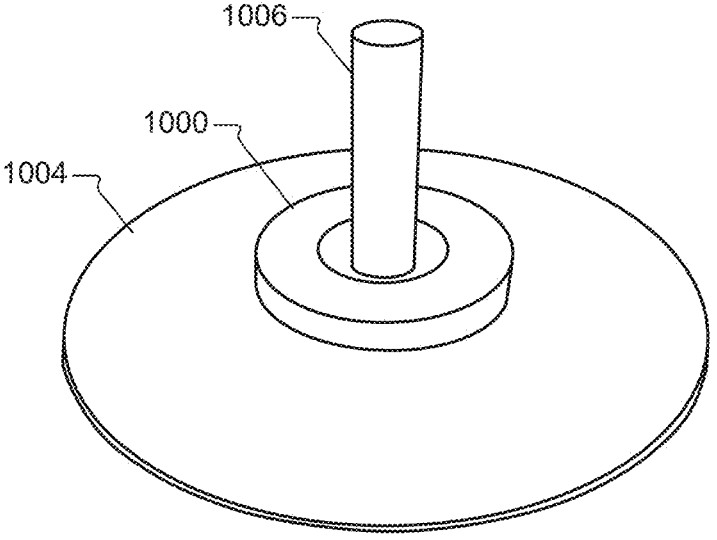
FIG. 11 is a top perspective view of the pair of coils and electrode film material of FIG. 10 in accordance with the present disclosure.
Figure 12:
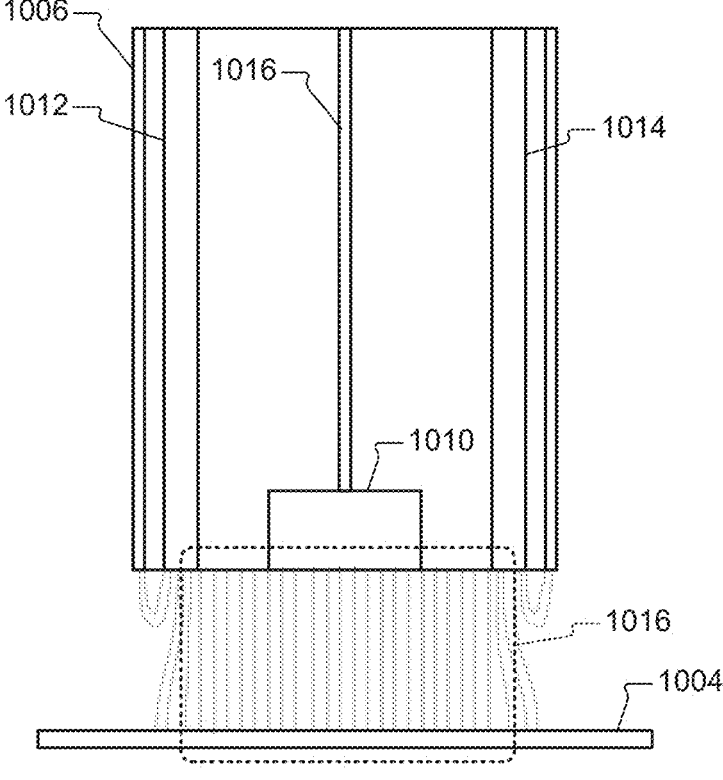
FIG. 12 is a side cross-sectional view of the capacitance sensor of FIGS. 10-11 in accordance with the present disclosure.

FIG. 10 shows a pair of coils 1000, 1002 used for eddy current NDE of electrode film material 1004 and a capacitance sensor 1006 to account for high lift-off. FIG. 11 shows the pair of coils 1000, 1002 and electrode film material 1004. FIG. 12 shows the capacitance sensor 1006. The coils 1000, 1002 may be operated as described above to determine a thickness of the electrode film material 1004. The capacitance sensor 1006 may extend through a middle of the coil 1000 and have a bottom surface that is vertically aligned with a bottom surface of the coil 1000 such that the capacitance sensor 1006 and the coil 1000 are a same distance from the electrode film material 1004. The capacitance sensor 1006 is used to characterize a nonlinear response in coil measurements for correction. This is done using high-precision lift-off measurement via the capacitance sensor 1006.

The capacitance sensor 1006 includes a measuring electrode 1010, a guard ring electrode 1012, an outer grounded housing 1014, and a signal line 1016. The capacitance sensor 1006 measures capacitance between the capacitance sensor head (i.e., the measuring electrode 1010) and the electrode film material 1004. A guard field 1016 is shown that is generated by the guard ring electrode 1012. The capacitance sensor 1006 operates independent of the eddy current coils 1000, 1002. In an embodiment, the capacitance sensor 1006 is included to acquire an accurate measurement of lift-off distance for compensation in post processing of signals obtained using the eddy current coils 1000, 1002 for thickness measurement. The lift-off distance measured by the capacitance sensor 1006 may be used when there is a large amount of lift-off variation (non-uniform magnetic field) such as, for example, more than ⅓ lift-off (or more than ⅓ change in the distance between the coils and electrode film material). The capacitance sensor 1006 or the like may be used in combination with any of the embodiments disclosed herein. Data output by the capacitance sensor 1006 may be received by one of the control modules disclosed herein.

Figure 13:
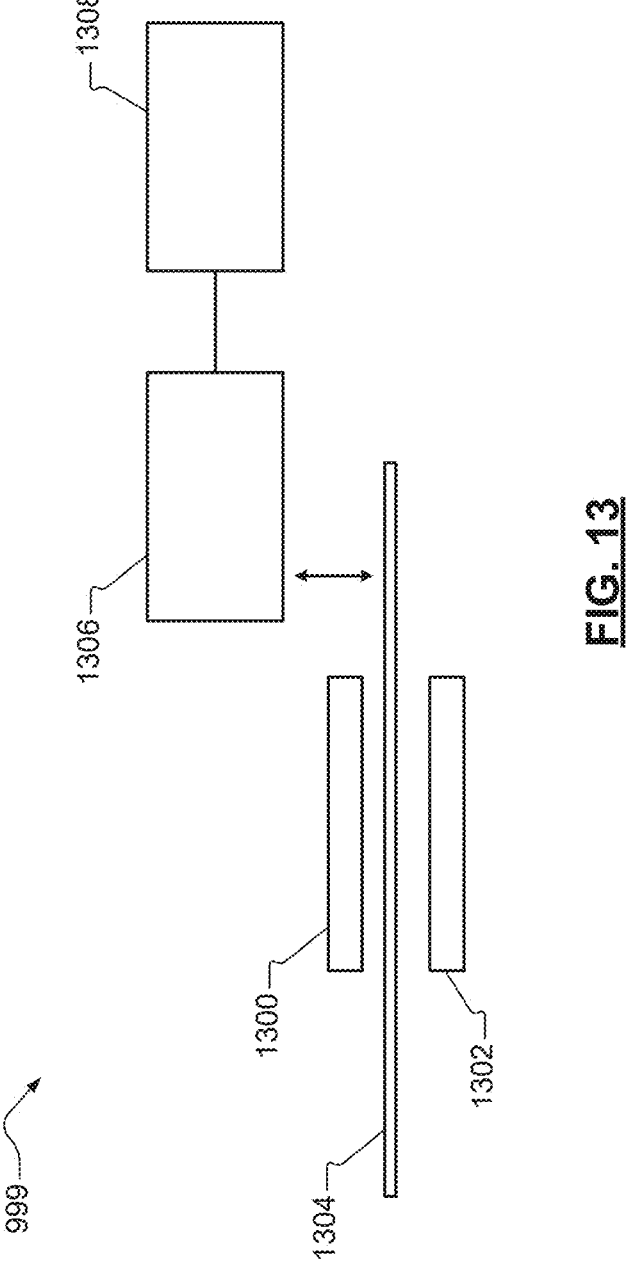
FIG. 13 is a side view of a pair of coils used for eddy current NDE of electrode film material and a laser vibrometer to account for high lift-off in accordance with the present disclosure.

FIG. 13 shows a pair of coils 1300, 1302 used for eddy current NDE of electrode film material 1304 and a laser vibrometer 1306 to account for high lift-off. The coils 1300, 1302 may be operated as described above to determine thickness of the electrode film material 1304. The laser vibrometer 1306 operates independent of the eddy current coils 1300, 1302. The laser vibrometer 1306 or the like may be used in combination with any of the embodiments disclosed herein. Data collected by the laser vibrometer may be stored in a memory 1308, which may be shared with one of the control modules referred to herein. In an embodiment, the laser vibrometer 1306 is included to acquire an accurate measurement of lift-off distance for compensation in post processing of signals obtained using the eddy current coils 1300, 1302 for thickness measurement. The lift-off distance measured by the laser vibrometer 1306 may be used when there is a large amount of lift-off variation (non-uniform magnetic field) such as, for example, more than ⅓ lift-off.

Another technique that may be used to measure high lift-off includes use of one or more eddy current coils (e.g., one of the eddy current coils used for thickness determination). The working frequency of the one or more eddy current coils is higher for lift-off determinations than for thickness determinations (or dual-phase transmission mode measurements). Electromagnetic fields generated at frequencies for thickness determinations pass through the electrode film material. This is unlike the electromagnetic fields generated at frequencies for lift-off determinations.

As an example, the coil disposed above the sample (or electrode film material) and the coil disposed below the sample work independently. In an embodiment, the coil above the sample is driven with a high-frequency signal $f_{high}$ (e.g., 100 MHz). The high frequency $f_{high}$ is for a few micron skin depth with no penetration through the sample (electrode film material). At $f_{high}$, the penetration depth of eddy current is much less than the thickness of a thin sample under test, and thus from the viewpoint of the coil above the sample, the thin sample behaves as an infinite thick material. For example, if we choose 500 MHz as $f_{high}$, the penetration depth for lithium is 6.78 µm, if the thickness of the thin lithium sample is more than 3 times of this value, e.g., 20 µm, then there is no difference from the viewpoint of the coil above the sample whether the thickness of sample is 20 µm, or 20 meters, as no amount AC magnetic field can penetrate the sample. At this stage, the impedance of the coil above the sample solely depends on the lift-off distance of the coil. By comparing the impedance of the coil above the sample in this mode to the impedance of the coil in air (far away from any metal), a comparison value is generated. The comparison value is stored as art of a calibration dataset and the lift-off distance is then determined based on the comparison value.

The procedure is not repeated for the coil under the sample as the distance between the two coils is known. The lift-off for the coil under the sample equals a gap between the two coils minus the lift-off distance for the coil above the sample. This procedure is separate from the actual thickness measurement, and since the working frequency is very high, the amount of additional time to determine the lift-off is minimal (e.g., 5 µs of additional time per point).

Thickness determinations, when there is high lift-off, may be adjusted based on the lift-off measurements provided by and/or using the above-described capacitance sensor 1006 of FIGS. 10-12, the above referred to laser vibrometer 1306 of FIG. 13, and/or an eddy current coil run at high-frequency (e.g., 100 MHz) as described above.

Regardless of how the lift-off distance is acquired (capacitance sensor, laser vibrometer, or high-frequency single coil mode), a correction to a raw complex transmission coefficient can be made based on the lift-off distance. The raw complex transmission coefficient refers to data directly acquired from measurement hardware without post-processing or calibration. In an embodiment, a look-up table is used to determine a pre-calculated correction factor based on the lift-off distance. The look-up table may be acquired by combing finite element simulation results and actual measurement results from samples with known thicknesses.

Figure 14:
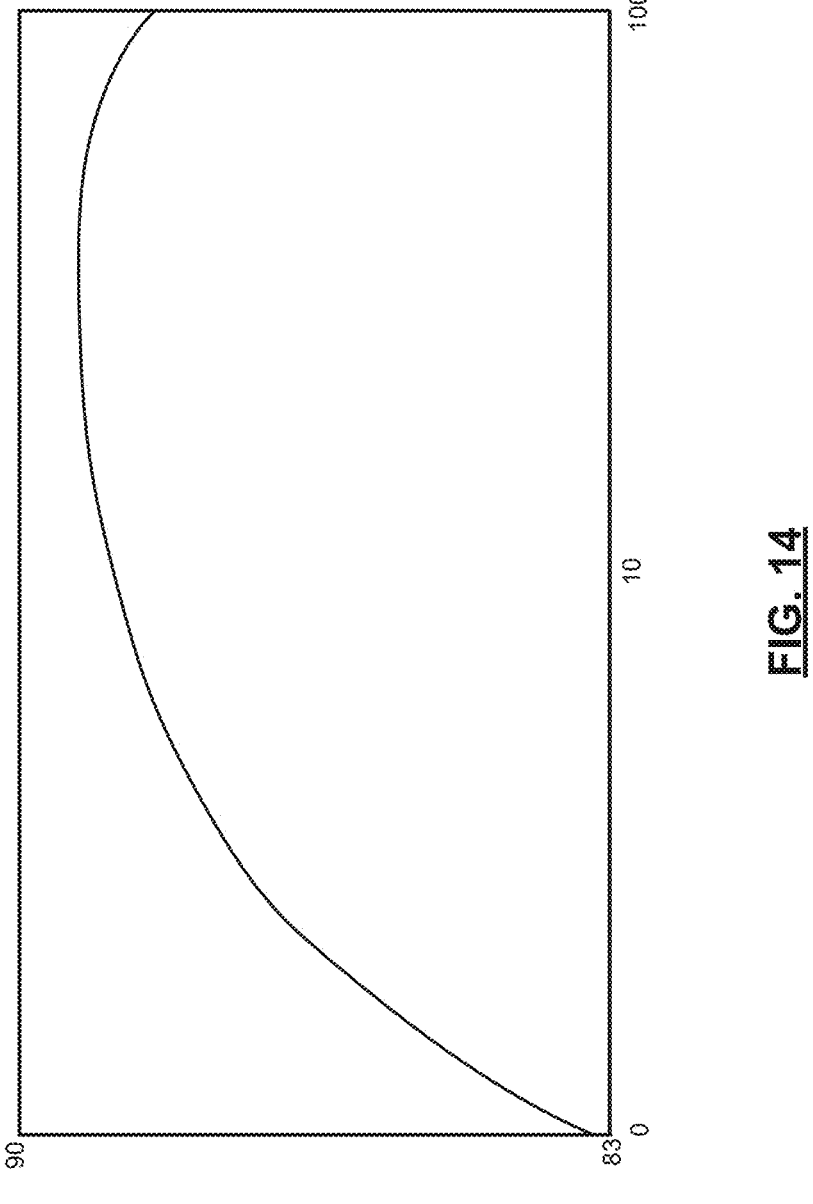
FIG. 14 is a plot of phase of impedance versus frequency in accordance with the present.

FIG. 14 shows a plot of phase of impedance versus frequency. As frequency of a signal supplied to a coil increases phase of the impedance of a coil generally increases for a certain usable operating frequency range. In this range, the coil operates as an inductor (i.e., has inductance). If the frequency exceeds a predetermined frequency, the coil no longer operates as an inductor and has capacitance. For purposes of the disclosed examples, the eddy current coils referred to herein are operated in frequency ranges such that the coils have inductance and operate as inductors.

Figure 15:
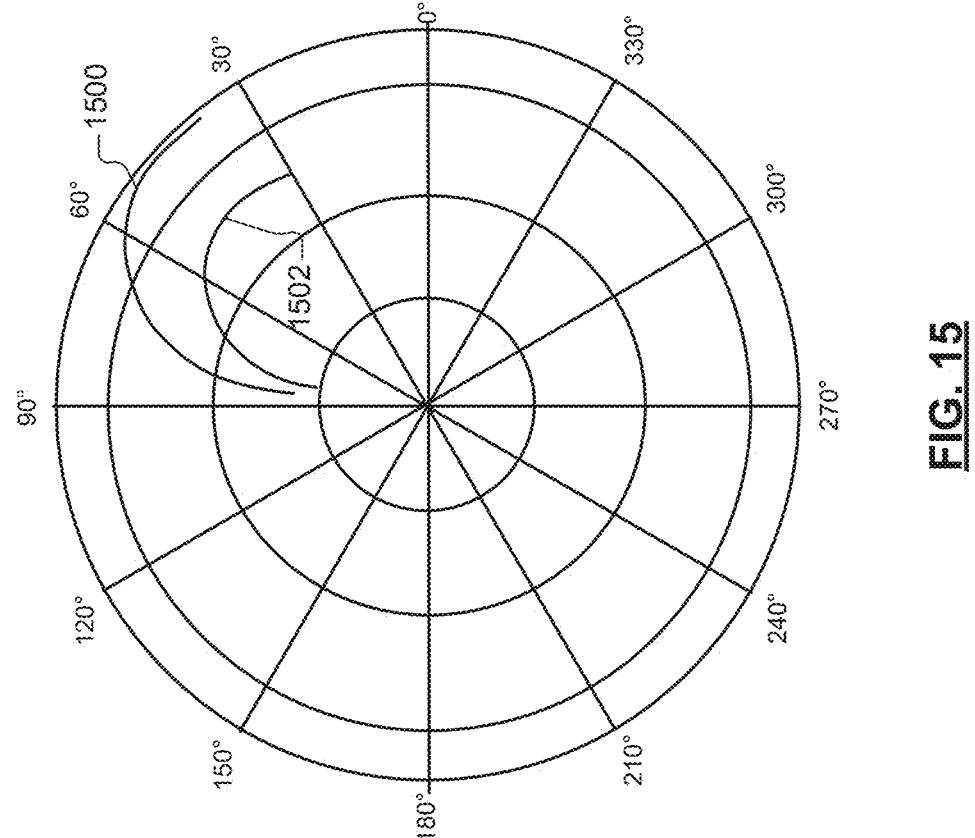
FIG. 15 is a polar plot of attenuation versus change in signal frequency for two different electrode film material thicknesses in accordance with the present disclosure.

FIG. 15 shows a polar plot of attenuation versus change in signal frequency for two different electrode film material thicknesses. The first material thickness is greater than the second material thickness. A first attenuation curve 1500 corresponds to the first thickness and is associated with change in frequency from, for example, 8 MHz to 21 MHz. A second attenuation curve 1502 corresponds to the second thickness and is associated with change in frequency from, for example, 8 MHz to 21 MHz. The values of the attenuation curves 1500, 1502 are inversely related to corresponding complex transmission coefficients determined using the above-described methods for determining thickness.

Figure 16A:
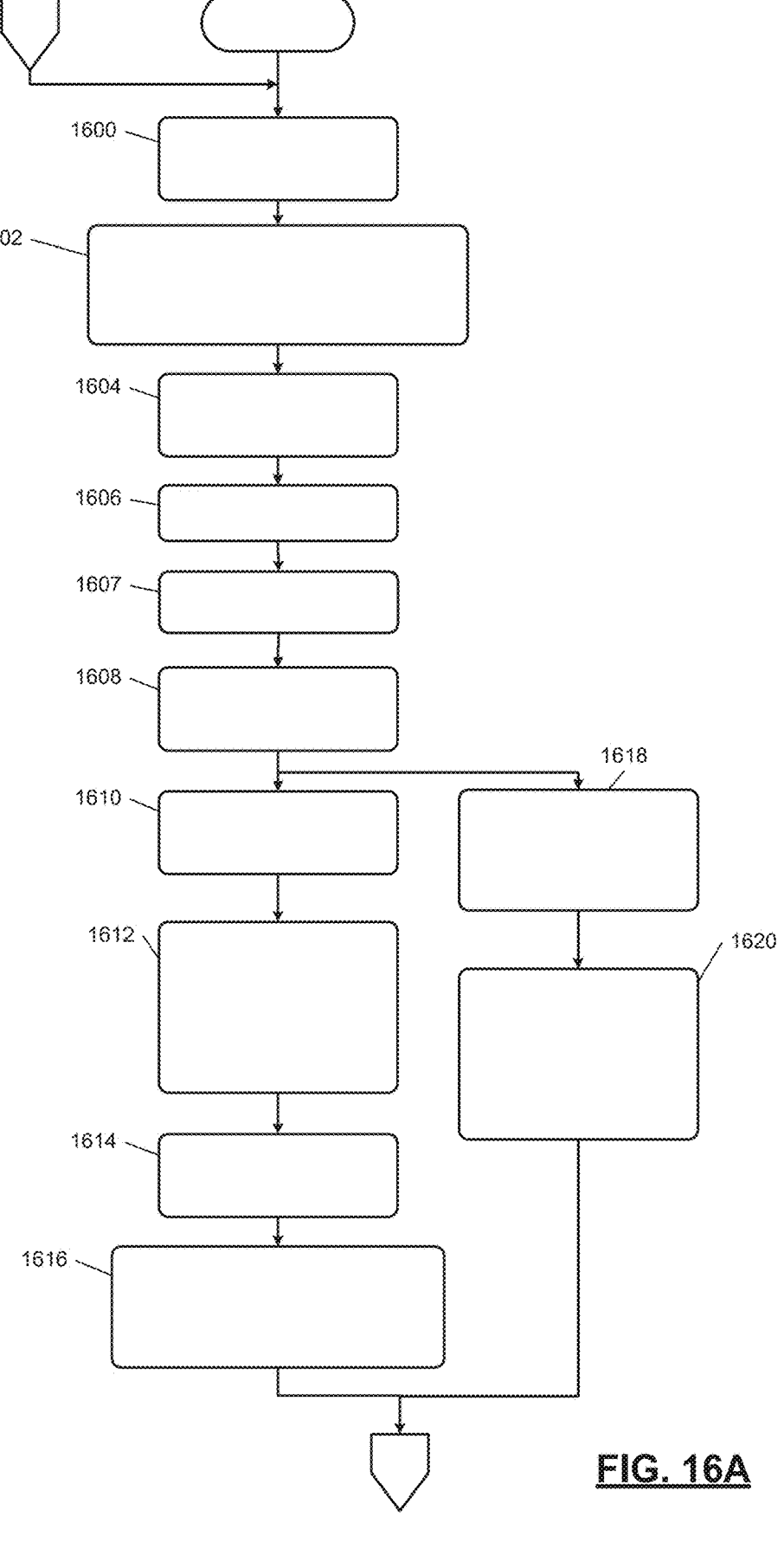
FIGS. 16A and 16B (collectively FIG. 16) illustrates an eddy current NDE method in accordance with the present disclosure.
Figure 16B:
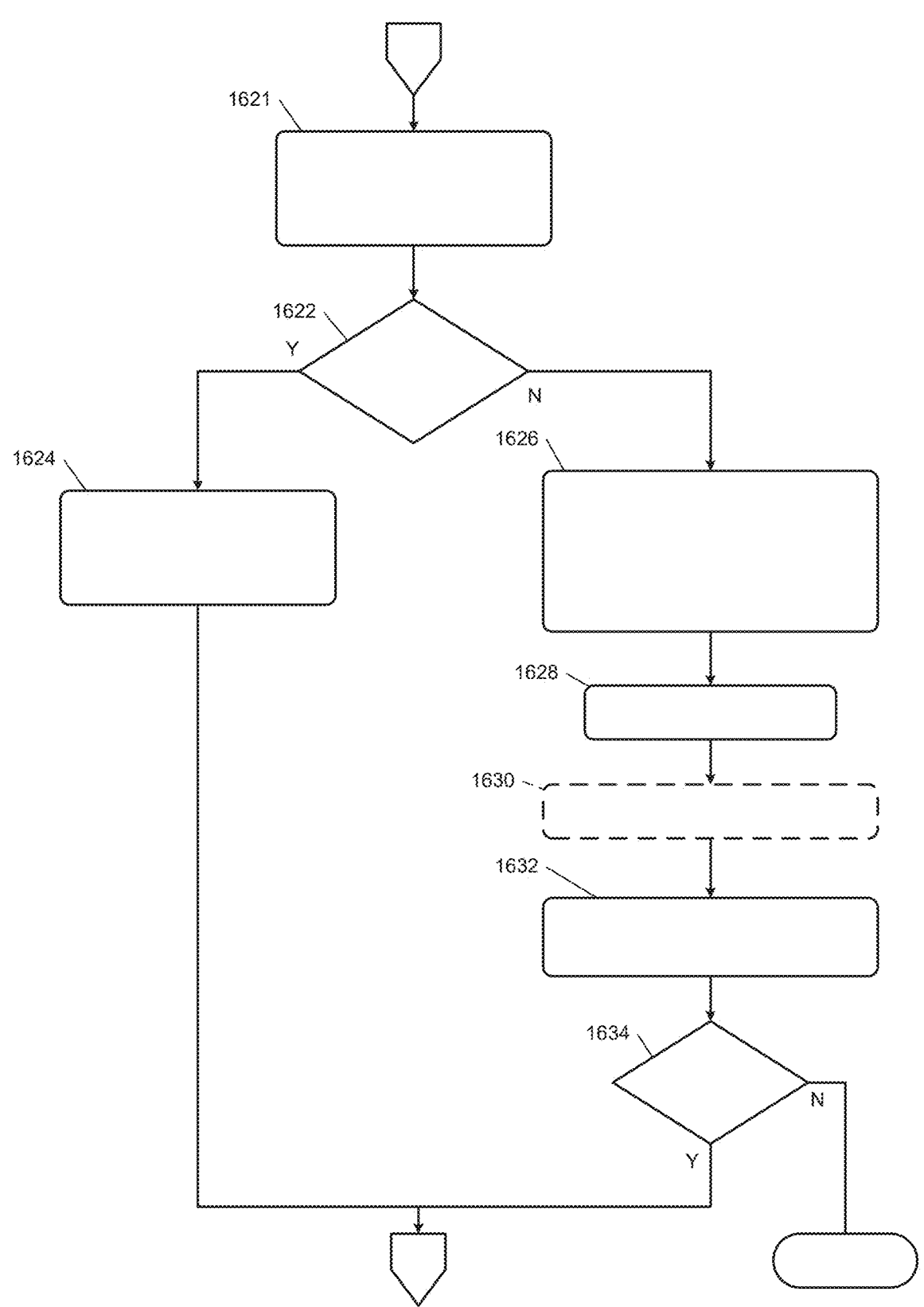

FIG. 16 illustrates an eddy current NDE method. The method may be iteratively performed. The method is applicable to the embodiments of FIGS. 1-2 and 6-13. The method may be performed for each pair of eddy current coils. Although the following operations are primarily described with respect to FIGS. 2 and 8, the operations may be implemented with respect to other embodiments of the present disclosure.

At 1600, one or more clock signals are generated via the clock generator 820. At 1602, the FPGA 804 generates a digital transmission signal including one or more signals having a respective one or more frequencies on a single channel.

At 1604, the DAC 806 converts the digital transmission signal to an analog signal. At 1606, the LPF 808 filters the analog signal to remove higher order frequencies.

At 1607, the switching circuit is set for the current phase. This includes setting connections such that a first one or more coils are to be operated in the transmit mode and a second one or more coils are to be operated in the receive mode.

At 1608, one of the amplifiers 810, 816 amplifies the filtered signal to provide a drive signal. If more than one transmit coil is being driven, then more than one amplifier may amplify the drive signal in parallel.

At 1610, one of the coils 812, 814 that is operating in the transmit mode receives the drive signal and generates an electromagnetic field. If more than one coil is being operated in the transmit mode, then the more than one coil receives the respective drive signals and generate respective electromagnetic fields.

At 1612, the other one of the coils 812, 814 that is operating in a receive mode generates an EMF voltage based on the electromagnetic field. If more than one coil is being operated in a receive mode, then the more than one coil generates respective EMF voltages.

At 1614, the other one of the amplifiers 810, 816 amplifies the output of the coil operating in the receive mode. If more than one coil is being operated in the receive mode, then more than one amplifier amplifies the respective outputs of the coils operating in the receive mode.

At 1616, the multiplier and/or other multipliers downconvert the amplified receive signals provided at 1614 to downconverted receive signals. Operation 1621 may be performed subsequent to operation 1616.

The following operations 1618 and 1620 may be performed in parallel with operations 1610, 1612, 1614 and 1616. At 1618, the one or more amplifiers amplifying the filtered signal generate reference signals, as described above. At 1620, the multiplier and/or other multipliers downconvert the reference signals to provide downconverted reference signals. Operation 1621 may be performed subsequent to operation 1620.

At 1621, the ADC 826 converts the downconverted receive signals and the downconverted reference signals to digital signals, which are provided to the FPGA 804. At 1622, the FPGA 804 and/or the control module 802 determines whether another phase is to be performed. If yes, operation 1624 is performed, otherwise operation 1626 is performed.

At 1624, the switching circuit 809 is set for the next phase. This may be via the FPGA 804 and/or the control module 802. This includes switching the first one or more coils operating in the transmit mode to operating in the receive mode, and switching the second one or more coils operating in the receive mode to operating in the transmit mode. This may also include ceasing generation of reference signals at first amplifiers(s) and initiating generation of reference signals at second amplifier(s). Operation 1600 may be performed subsequent to operation 1624.

At 1626, the FPGS 804 and/or the control module 1602 determines one or more thicknesses of the sample (or electrode film material) between each pair of coils involved, as described above. At 1628, lift-off distance may be determined using any of the above-described methods. At 1630, the thickness is adjusted based on the lift-off distance as described above. In an embodiment, operation 1630 is performed when the lift-off distance is greater than a predetermined amount (e.g., more than ⅓ the distance between i) a center position between a pair of coils, and ii) one of the coils in the pair of coils).

At 1632, the FPGA 804 and/or the control module 802 performs feedback and/or feedforward control of the actuators and motors 231, 233, as described above. At 1634, the FPGA 804 and/or the control module 802 determines whether another iteration of this method is to be performed. If yes, operation 1600 is performed, otherwise the method ends.

The above-described examples include a through-transmission eddy current methods to accurately evaluate the thickness of electrodes including lithium metal anodes during roll-to-roll manufacturing, a battery manufacturing process. The disclosed hardware enables a dual-phase measurement routine, which significantly reduces measurement error due to sample vibration. The described methods account for and/or are insensitive to vibration and vertical lift-off and thus provide accurate thickness measurements when a sample being evaluated is vibrating and/or is moving vertically. This allows for accurate feedback and feedforward control of thickness for improved thickness uniformity for production of cathodes satisfying capacity requirements.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An eddy current non-destructive evaluation system for an electrode film material, the system comprising:
at least one control module configured to generate a transmission signal; and
a first pair of coils comprising
a first coil disposed adjacent the electrode film material and configured to operate in a transmit mode, and, based on the transmission signal, to generate an electromagnetic field that passes through the electrode film material, and
a second coil disposed adjacent and on an opposite side of the electrode film material as the first coil and configured to operate in a receive mode, wherein the second coil is configured to generate a first electromagnetic field voltage based on the electromagnetic field, and
wherein the at least one control module is configured
based on the first electromagnetic field voltage, to at least one of determine a first thickness of the electrode film material and detect a defect of the electrode film material, and
operate the first coil in a receive mode and the second coil in a transmit mode such that the first coil generates a second electromagnetic field voltage, and to determine the first thickness based on the first electromagnetic field voltage and the second electromagnetic field voltage.

2. The system of claim 1, wherein the at least one control module is configured to i) determine a first complex transmission coefficient based on the first electromagnetic field voltage, ii) determine a second complex transmission coefficient based on the second electromagnetic field voltage, iii) average the first complex transmission coefficient and the second complex transmission coefficient, and iv) determine the first thickness based on the average.

3. The system of claim 1, further comprising a switching circuit connected between i) the at least one control module and ii) the first coil and the second coil, wherein the at least one control module is configured to control the switching circuit to transition operation of the first coil and the second coil between operating in the transmit mode and the receive mode.

4. The system of claim 1, further comprising an amplifier configured, based on the transmission signal, to generate a drive signal to drive the first coil, and to generate a reference signal proportional to the drive signal, wherein the at least one control module is configured to determine the first thickness based on the reference signal.

5. The system of claim 4, further comprising:

a first multiplier configured to downconvert the reference signal to a downconverted reference signal; and a second multiplier configured to downconvert a receive signal to a downconverted receive signal, wherein the second coil generates the receive signal including the first electromagnetic field voltage, and the at least one control module is configured to determine the first thickness based on the downconverted reference signal and the downconverted receive signal.

6. The system of claim 1, wherein the transmission signal comprises a plurality of frequencies.

7. The system of claim 1, further comprising at least one of a capacitance sensor and a laser vibrometer configured to determine a lift-off distance between the electrode film material and one of the first coil and the second coil, wherein the at least one control module is configured to adjust the first thickness based on the lift-off distance.

8. The system of claim 1, wherein the at least one control module is configured to operate the first coil to determine a lift-off distance between the electrode film material and one of the first coil and the second coil, and to adjust the first thickness based on the lift-off distance.

9. An eddy current non-destructive evaluation system for an electrode film material, the system comprising:

at least one control module configured to generate a transmission signal;

a first pair of coils comprising a first coil disposed adjacent the electrode film material and configured to operate in a transmit mode, and, based on the transmission signal, to generate an electromagnetic field that passes through the electrode film material, and a second coil disposed adjacent and on an opposite side of the electrode film material as the first coil and configured to operate in a receive mode, wherein the second coil is configured to generate a first electromagnetic field voltage based on the electromagnetic field, and wherein the at least one control module is configured, based on the first electromagnetic field voltage, to at least one of determine a first thickness of the electrode film material and detect a defect of the electrode film material; and a second pair of coils comprising a third coil disposed adjacent the electrode film material and configured to operate in a transmit mode, and, based on the transmission signal, to generate an electromagnetic field that passes through the electrode film material, and a fourth coil disposed adjacent and on an opposite side of the electrode film material as the third coil and configured to operate in a receive mode, wherein the fourth coil is configured to generate a second electromagnetic field voltage based on the electromagnetic field generated by the third coil; and a first multiplexer configured to select between the second coil and the fourth coil, wherein the at least one control module is configured to control a state of the first multiplexer, and to determine a second thickness based on the second electromagnetic field voltage.

10. The system of claim 9, further comprising:

a first amplifier configured to generate a first drive signal to drive the first coil based on the transmission signal and output a first reference signal based on the first drive signal;

a second amplifier configured to generate a second drive signal to drive the third coil based on the transmission signal and output a second reference signal based on the second drive signal; and a second multiplexer configured to select between the first amplifier and the second amplifier, wherein the at least one control module is configured to control a state of the second multiplexer, to determine the first thickness based on the first reference signal, and to determine the second thickness based on the second reference signal.

11. An eddy current non-destructive evaluation method for electrode film material, the method comprising:

generating a transmission signal;

operating a first coil, disposed adjacent the electrode film material, in a transmit mode, and, based on the transmission signal, to generate an electromagnetic field that passes through the electrode film material;

operating a second coil, disposed adjacent and on an opposite side of the electrode film material as the first coil, in a receive mode, and to generate a first electromagnetic field voltage based on the electromagnetic field;

based on the first electromagnetic field voltage, at least one of determining a first thickness of the electrode film material and detecting a defect of the electrode film material;

based on the transmission signal, generating a drive signal to drive the first coil, and generating a reference signal proportional to the drive signal;

downconverting the reference signal to a downconverted reference signal;

downconverting a receive signal to a downconverted receive signal;

generating via the second coil the receive signal including the first electromagnetic field voltage; and determining the first thickness based on the downconverted reference signal and the downconverted receive signal.

12. The method of claim 11, further comprising:

operating the first coil in a receive mode and the second coil in a transmit mode such that the first coil generates a second electromagnetic field voltage; and determining the first thickness based on the second electromagnetic field voltage.

13. The method of claim 12, further comprising:

determining a first complex transmission coefficient based on the first electromagnetic field voltage;

determining a second complex transmission coefficient based on the second electromagnetic field voltage;

averaging the first complex transmission coefficient and the second complex transmission coefficient; and determining the first thickness based on the average.

14. The method of claim 11, wherein the transmission signal comprises a plurality of frequencies.

15. The method of claim 11, further comprising:

operating a third coil, disposed adjacent the electrode film material, in a transmit mode, and, based on the transmission signal, to generate an electromagnetic field that passes through the electrode film material;

operating a fourth coil, disposed adjacent and on an opposite side of the electrode film material as the third coil, in a receive mode, and to generate a second electromagnetic field voltage based on the electromagnetic field generated by the third coil; and determining a second thickness based on the second electromagnetic field voltage.

16. The method of claim 15, further comprising:

generating a first drive signal to drive the first coil based on the transmission signal and outputting a first reference signal based on the first drive signal;

generating a second drive signal to drive the third coil based on the transmission signal and outputting a second reference signal based on the second drive signal;

determining the first thickness based on the first reference signal; and determining the second thickness based on the second reference signal.

17. The method of claim 11, further comprising:

determining a lift-off distance between the electrode film material and one of the first coil and the second coil; and adjusting the first thickness based on the lift-off distance.

* * * * *